Patented Feb. 9, 1943

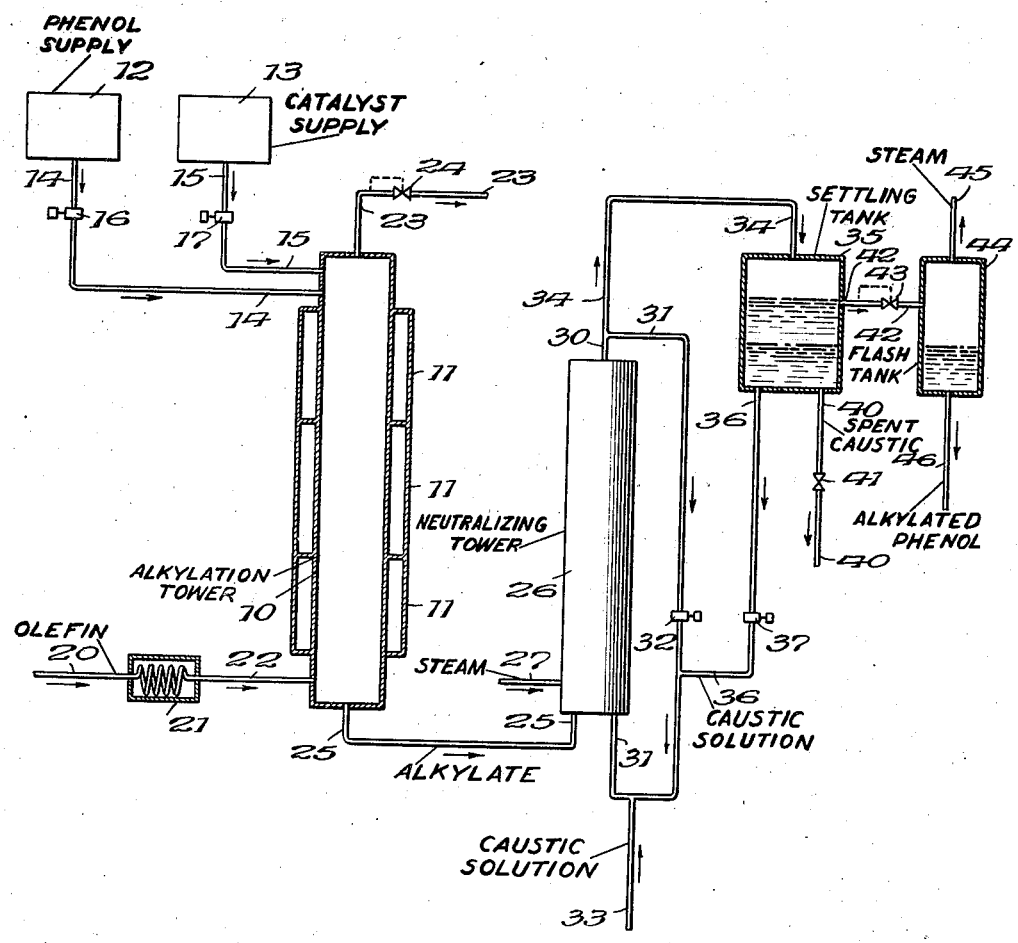

2,310,663

UNITED STATES PATENT OFFICE 2,310,663

PRODUCTION OF ALKYLATED PHENOLS

William Whitney Weinrich, Oakmont, and Edward J. Loew, Lansdowne, Pa., assignors to Gulf Research & Development Company, Pittsburgh, Pa., a corporation of Delaware Application June 3, 1940, Serial No. 338,632

8 Claims. (Cl. 260—624)

This invention or discovery relates to the production of alkylated phenols; and it is particularly concerned with an improvement in the process of producing alkylated phenols by treating a phenolic material with a tertiary olefin in the presence of a catalyst selected from the group consisting of sulfuric acid and alkyl esters of sulfuric acid, said improvement comprising washing the reaction product with dilute aqueous alkali solution at a temperature above 100° C. under superatmospheric pressure whereby the acid and acid-forming components of the reaction mixture are substantially completely removed and an alkylated phenol fraction is recovered which may be fractionally distilled substantially without dealkylation; all as more fully hereinafter set forth and as claimed.

By treating phenol and its lower homologues, such as the cresols, xylenols and ethyl phenols, with olefins, particularly the tertiary olefins (olefins capable of forming tertiary alcohols on hydration) in the presence of small amounts of sulfuric acid condensing agents, a mixture of alkylated phenols, some of which are insoluble in dilute aqueous alkali solution, can be obtained. These alkali-insoluble alkylated phenols, which are the tri-alkylated-mono-hydroxy phenols having a total of four or more carbon atoms in the alkyl groups ortho to the hydroxyl group, are particularly useful as antioxidants in petroleum products, such as cracked gasoline, lubricating and insulating oils, greases and the like. The alkali soluble products also have some utility as antioxidants and as insecticide.

In the production of these alkylated phenols it is economical to treat the commercially available phenolic materials, such as phenol itself, mixtures of cresols and the cresylic acids derived from coal tar or petroleum, with olefinic gas mixtures such as refinery gases containing mixtures of $C_3$ to $C_6$ hydrocarbons, or the $C_4$ or $C_5$ cut of such refinery gases. The reaction product is then customarily washed with a dilute aqueous alkali solution and, if necessary, with water at ordinary temperatures to remove the acid catalyst. The product remaining is then fractionally distilled to isolate and recover individual alkylated phenols.

We have found that during the frictional distillation of an alkylated phenol product obtained in this manner acidity gradually develops which causes a substantial decomposition of the alkylated phenols by dealkylation, with liberation of olefins. Acidity also develops on continued standing of the crude alkylation product prepared in the above manner.

It is an object achieved by the present invention to overcome this difficulty and to provide an improved method for the production of alkylated phenols, particularly alkali-insoluble alkylated phenols, by treating a phenolic material with a tertiary olefin or a mixture of gases containing tertiary olefins along with primary or secondary olefins in the presence of a catalyst selected from the group consisting of sulfuric acid and the alkyl esters of sulfuric acid wherein all of the acid and acid-forming components of the reaction mixture are removed prior to fractionation and substantially no dealkylation of the alkylated phenols takes place during the fractional distillation.

We have found that when a mixture of gases, such as a refinery gas or a $C_4$ or $C_5$ cut of refinery gases containing tertiary olefins along with primary or secondary olefins (olefins which form only primary to secondary alcohols on hydration) is used in the alkylation of phenols in the presence of a sulfuric acid catalyst such as sulfuric acid itself and the alkyl esters of sulfuric acid, certain acid-forming components present in the reaction products cannot be removed by washing with dilute aqueous alkali solution at temperatures below 100° C., but that both the acid and the acid-forming components of the reaction products can be removed without substantial solution of the alkali-insoluble alkylated phenols by washing the reaction mixture with dilute aqueous alkali solution at temperatures above 100° C. and under superatmospheric pressure. The washed reaction product may then be fractionally distilled without any substantial development of acidity and without substantial dealkylation of the alkylated phenols.

As phenolic raw materials for the production of alkylated phenols insoluble in dilute aqueous alkali solution according to the method of our invention we may use phenol, ortho-cresol, meta-cresol, para-cresol, 2,4-di-methyl phenol, ortho- and para-propyl phenols, ortho- and para-butyl phenols and other mono-and di-alkylated mono-hydroxy phenols in which the alkyl substituents occupy the ortho or para positions or both relative to the hydroxyl group, as well as mixtures containing these phenols, such as mixed cresols and cresylic acids derived from coal tar and petroleum.

The olefinic starting materials used in the method of our invention are tertiary olefins or mixtures of gases containing tertiary olefins along with normal and/or secondary olefins, particularly butylenes, amylenes and the like. Refinery gases, such as the heavier of the hydrocarbons usually found as vapors in cracking still gases, contain varying quantities of these olefins, as well as higher olefins, and may be used as starting materials. Or the olefins may be used in admixture with closely related paraffins, for example, the $C_4$ cut of a refinery gas consisting largely of butane, butene-1, butene-2 and isobutylene, or the $C_5$ cut of refinery gas. In mixtures of olefins and paraffins the presence of the paraffins has no effect other than to reduce the concentration of the olefin. The presence of the primary or secondary olefins, however, apparently causes the formation of compounds which are not normally soluble in dilute aqueous alkali solution at temperatures below 100° C. and which on subsequent fractional distillation of the reaction mixture decompose to form acidic materials which in turn cause dealkylation of the alkylated phenols it is sought to recover.

The alkylation reaction is advantageously conducted at somewhat elevated temperatures, for example, temperatures up to about 100° C. and under atmospheric or moderately elevated pressures below about 100 pounds per square inch gage in the presence of a sulfuric acid condensing agent selected from the group consisting of sulfuric acid and the alkyl esters of sulfuric acid. We have obtained very good results at about 85° C. under pressure of approximately 80 pounds per square inch gage. The amount of sulfuric acid required is relatively small with respect to the amount of phenol. It is advantageously used in an amount equal to not less than about 1.0 per cent of the phenol. More than 10 per cent of sulfuric acid based on the weight of the phenol is not ordinarily worth while. When alkyl esters of sulfuric acid are used as condensing agents they are used in corresponding amounts.

After the alkylation reaction is complete, the reaction mixture is washed according to the method of our invention to remove all of the acid and acid-forming components thereof. In carrying out this step we have found that an aqueous solution of caustic soda produces good results. Aqueous solutions of other alkalies, such as the hydroxide of potassium or ammonium, may also be used. The causticity of the solution and the amount of solution used should be such that the aqueous layer, separated after the washing, is slightly alkaline. The exact concentration of the alkali solution used is not critical so long as the total amount of alkali present in the wash solution is sufficient to neutralize all of the acid acting condensing agent originally introduced into the reaction mixture and so long as it is insufficient to cause precipitation of sodium sulfate from the wash solution.

In order to effect removal of the acid-forming complexes it is necessary that the alkali washing be carried out at a temperature above about 100° C. under super-atmospheric pressure. At temperatures just above 100° C. and at corresponding pressures removal is relatively slow. Higher temperatures and pressures have been found more advantageous in commercial operation. The time required for neutralization in general is less with higher steam pressures. The upper pressure limit is defined by the thermal stability of the alkylated phenols as well as by economic and equipment considerations. Pressures above about 125 pounds per square inch are not generally desirable. The time required for neutralization is also modified by the stirring rate or violence as well as by the size of the reaction chamber and the amount of material being treated in it.

The washing with aqueous alkali solution under pressure may be readily carried out either in batch or continuous operation. In batch operation the alkylated phenol reaction mixture is introduced into a closed vessel along with a suitable quantity of alkali solution, live steam is introduced until the desired temperature and pressure are obtained and the reaction mixture and alkali wash are agitated together for a sufficient time to remove the acid-forming materials. The mixture is then allowed to settle and the aqueous phase is separated from the alkali-insoluble fraction. The alkali-insoluble alkylated phenol product may then be fractionally distilled.

In the accompanying drawing there is illustrated schematically a suitable apparatus for continuously carrying out the process of our invention. In this apparatus an alkylation tower 10 provided with external temperature control means 11 is suitably connected with a phenol supply tank 12 and catalyst supply tank 13 through conduits 14 and 15 and pumps 16 and 17, respectively, and with an olefin source (not shown) through conduit 20, preheater 21 and conduit 22. A bleed-off line 23 and back pressure control valve 24 are provided at the top of the alkylation tower. The alkylation tower 10 is connected at the bottom by conduit 25 with the bottom of neutralizing tower 26. The neutralizing tower 26 is connected at its bottom with a steam supply line 27 and is provided with an external recirculating system consisting of conduits 30 and 31 and pump 32. The recirculating system is connected with a source of fresh caustic solution (not shown) through line 33. The neutralizing tower and recirculating system are connected at its top through conduit 34 with a settling tank 35. Settling tank 35 is provided at its bottom with two outlets, one of which is connected by conduit 36 through pump 37 with conduit 31 of the neutralization tower recirculating system and the other of which is connected through conduit 40 and valve 41 with a wash water collecting and treating system (not shown). The settling tank 35 is provided at or near its top with an outlet which is connected through conduit 42 and back pressure valve 43 with the flash tank 44 which is provided at its top with steam outlet 45 and which is connected at its bottom through conduit 46 with a suitable alkylated phenol collecting and holding tank (not shown).

Alkylation tower 10 may be a packed tower or it may be provided with perforated plates, bubble trays or any other suitable means for intimately contacting a gas with a liquid. The temperature control means 11 is advantageously segmented as indicated so that if desired a temperature gradient can be maintained throughout the length of the tower. Neutralizing tower 26 may be a packed or an unpacked vessel or it may be provided with bubble trays, perforated plates, or any other conventional contacting means. Settling tank 35 is advantageously provided with a suitable means (not shown) for observing and regulating liquid levels therein. Flash tank 43 is a conventional holding vessel of suitable size and construction.

In operation, phenolic material, such as phenol or a mixture of cresols or xylenols is pumped from supply tank 12 through line 14 and pump 16 into the top of tower 10. Sulfuric acid catalyst is introduced from tank 13 through line 15 by means of pump 17 into the top of tower 10. A suitable olefinic gas, such as the butane cut of cracking gas is supplied under pressure through line 20, preheater 21 and line 22 to the bottom of tower 10. A countercurrent flow of olefinic gas and phenol-catalyst mixture is produced in tower 10. The temperature of the contents of the tower is appropriately regulated, usually by supplying a cooling liquid to jacket 11. Unreacted gases leave tower 10 through line 23 and back pressure control valve 24. A liquid reaction mixture comprising alkylated phenols and containing acid catalyst and acid-forming reaction products (hereinafter referred to as "alkylate") is withdrawn from the bottom of tower 10 and passes through line 25 into the bottom of neutralizing vessel 26. A dilute aqueous alkali solution is introduced into the bottom of tower 26 through lines 33 and 31. Steam under pressure in an amount sufficient to maintain a superatmospheric pressure, usually about 40 pounds per square inch, and a corresponding temperature above 100° C. is introduced through line 27 into the bottom of tower 26.

The mixture of steam, alkylate and dilute alkali solution is agitated by being recirculated through the recirculating system consisting of conduits 30 and 31 and pump 32. A portion of the mixed alkylate, steam and wash water is continuously tapped off through conduit 34 to settling tank 35. By maintaining the rate of recirculation several times as fast as the rate of flow of alkylate into and out of the neutralizing tower and recirculating system, a suitable degree of agitation can be maintained. A holding period suitable for complete separation of the acid and acid-forming materials from the alkylate is maintained by regulating the rate of flow of alkylate into and out of the recirculating system.

The portion of the mixture of alkylate, alkali wash and steam which passes through conduit 34 to settling tank 35 is allowed to remain quiescent and stratifies into an upper layer of alkylate and a lower layer of wash water. The wash water may be partly circulated from settling tank 35 through line 36 and pump 37 to recirculating line 31 of neutralizing tower 26. This mode of operation is generally used when the throughput of the system is high in relation to the rate of recirculation in order to maintain a desirable ratio of volume of wash water to volume of alkylate. This ratio should be at least 1:1 and is advantageously about two or three to one. By means of alkali solution introduced through line 33 into line 31, a continuous supply of fresh alkali solution may be maintained and the amount of alkali in the system may be controlled. Part or all of the wash water from settling tank 35 may be withdrawn through conduit 40 and valve 41 and treated to recover dissolved alkali-soluble reaction products.

The alkylate is taken off near the top of settling tank 35 through conduit 42 and back pressure valve 43 into flash tank 44 where the pressure is released and steam flashes off through conduit 45. The alkylate is collected in the flash tank and is tapped off through conduit 46 to a suitable storage vessel where it is held until ready for fractional distillation.

The following example illustrates the advantageous result of removing all of the acid-forming as well as the acid components of the alkylated phenol reaction mixture according to the method of our invention.

A commercial mixture of meta- and para-cresol was reacted with a butane-butene mixture in the presence of 5.0 per cent by weight of sulfuric acid at a temperature of about 185° F. under a pressure of 80 pounds per square inch gage. A portion of the reaction mixture or alkylate (portion A) thus obtained was washed with dilute caustic soda solution sufficiently to make it neutral to all ordinary tests but insufficiently to remove all of the acid-forming components. A second portion of alkylate (portion B) was washed at a temperature above 100° C. under 30 pounds per square inch gage steam pressure sufficiently to remove all of the acid and acid-forming components. Both portions of alkylate were then fractionally distilled and yielded the following products.

| Constituent | Sample | |
|---|---|---|
| | Portion A | Portion B |
| | Weight percent | Weight percent |
| Polymer | 4.3 | 3.8 |
| Isobutylene | 9.4 | |
| Monobutyl-cresols | 51.6 | 18.3 |
| Dibutyl-p-cresol | 22.1 | 31.2 |
| Dibutyl-m-cresol | 12.6 | 46.7 |
| | 100.0 | 100.0 |

The composition of portion B represents the actual composition of the alkylate as made while the composition of portion A illustrates how the original alkylate was modified by dealkylation during fractionation. Over half of the original di-butylated cresols were dealkylated to mono-butylated cresols and almost 10.0 per cent of isobutylene was liberated.

This invention has been illustrated hereinabove by certain embodiments and specific examples but it is not restricted to such embodiments and examples except as hereinafter defined in the claims.

What we claim is:

1. A process of producing alkylated phenols, comprising contacting a phenol in the presence of a catalyst selected from the group consisting of sulfuric acid and the alkyl esters of sulfuric acid with a tertiary olefin and removing the acid and acid-forming components from the reaction mixture by washing with a dilute aqueous alkali solution at a temperature above 100° C. and under superatmospheric pressure, said temperature being sufficiently high to maintain a substantial superatmospheric steam pressure less than about 125 pounds per square inch gage.

2. A process of producing alkali-insoluble alkylated phenols which comprises contacting a phenol in the presence of a sulfuric acid catalyst with a mixture of gases containing a tertiary olefin along with primary and secondary olefins, removing the acid and acid-forming impurities from the reaction mixture by washing with a dilute aqueous alkali solution at a temperature above 100° C. and under superatmospheric pressure said temperature being sufficiently high to maintain a substantial superatmospheric steam pressure less than about 125 pounds per square inch gage, and thereafter fractionally distilling the washed product.

3. A process of producing an alkali-insoluble tertiary butyl phenol which comprises contacting a phenol with a C₄ cut of a refinery gas in the presence of a sulfuric acid catalyst, removing the acid and acid-forming impurities from the reaction mixture by washing with a dilute aqueous alkali solution at a temperature above 100° C. and under superatmospheric pressure said temperature being sufficiently high to maintain a substantial superatmospheric steam pressure less than about 125 pounds per square inch gage, and thereafter fractionally distilling the washed product.

4. A method of producing a tertiary amyl phenol which comprises contacting a phenol with a C₅ cut of a refinery gas in the presence of a sulfuric acid catalyst, removing the acid and acid-forming impurities from the reaction mixture by washing with a dilute aqueous alkali solution at a temperature above 100° C. and under superatmospheric pressure said temperature being sufficiently high to maintain a substantial superatmospheric steam pressure less than about 125 pounds per square inch gage, and thereafter fractionally distilling the washed product.

5. In a process of producing alkylated phenols by reacting a phenol with a tertiary olefin in the presence of a catalyst selected from the group consisting of sulfuric acid and the alkyl esters of sulfuric acid, the step comprising removing acid and acid-forming impurities from the reaction product by washing with dilute aqueous alkali solution at a temperature above 100° C. under superatmospheric pressure, said temperature being sufficiently high to maintain a substantial superatmospheric steam pressure less than about 125 pounds per square inch gage.

6. In a process of producing alkylated phenols by reacting a phenol with a tertiary olefin in the presence of an alkyl ester of sulfuric acid, the step comprising removing acid and acid-forming impurities from the reaction product by washing with dilute aqueous alkali solution at a temperature above 100° C. under superatmospheric pressure, said temperature being sufficiently high to maintain a substantial superatmospheric steam pressure less than about 125 pounds per square inch gage.

7. In a process of producing alkylated phenols by reacting a phenol in the presence of a sulfuric acid catalyst with a mixture of gases containing tertiary olefin along with primary and secondary olefins, the step comprising removing acid and acid-forming impurities from the reaction product by washing with dilute aqueous alkali solution at a temperature above 100° C. and under superatmospheric pressure, said temperature being sufficiently high to maintain a substantial superatmospheric steam pressure less than about 125 pounds per square inch gage.

8. A method of purifying an alkylated phenolic reaction mixture produced by contacting a mixture of gases containing a tertiary olefin along with primary and secondary olefins with a phenol in the presence of sulfuric acid catalyst which comprises removing acid and acid-forming impurities by washing with a dilute aqueous alkali solution at a temperature above 100° C. and under superatmospheric pressure, said temperature being sufficiently high to maintain a substantial superatmospheric steam pressure less than about 125 pounds per square inch gage.

WILLIAM WHITNEY WEINRICH.
EDWARD J. LOEW.